United States Patent
Banas

(10) Patent No.: US 11,042,947 B1
(45) Date of Patent: Jun. 22, 2021

(54) SYSTEM FOR MATCHING AND ASSEMBLING A WATER LEAK DETECTION SYSTEM

(71) Applicant: Gwen C. Banas, Naples, FL (US)

(72) Inventor: Gwen C. Banas, Naples, FL (US)

(*) Notice: Subject to any disclaimer, the term of this patent is extended or adjusted under 35 U.S.C. 154(b) by 72 days.

(21) Appl. No.: 16/357,388

(22) Filed: Mar. 19, 2019

(51) Int. Cl.
*G01M 3/16* (2006.01)
*G06Q 50/06* (2012.01)

(52) U.S. Cl.
CPC .............. *G06Q 50/06* (2013.01); *G01M 3/16* (2013.01)

(58) Field of Classification Search
CPC ..................................................... G06Q 50/06
See application file for complete search history.

(56) References Cited

U.S. PATENT DOCUMENTS

| | | | |
|---|---|---|---|
| 7,308,394 B2 | 12/2007 | Johnson | |
| 7,933,605 B2 | 4/2011 | Rappaport et al. | |
| 2001/0032062 A1 | 10/2001 | Plaskoff et al. | |
| 2003/0023411 A1 | 1/2003 | Witmer et al. | |
| 2004/0186755 A1 | 9/2004 | Roche | |
| 2014/0288979 A1 | 9/2014 | Prinn | |
| 2016/0327921 A1* | 11/2016 | Ribbich | F24F 11/30 |
| 2017/0365008 A1* | 12/2017 | Schreier | G06Q 40/08 |

FOREIGN PATENT DOCUMENTS

WO   WO2016/086077   6/2016

* cited by examiner

*Primary Examiner* — Paul M. West
*Assistant Examiner* — Mark A Shabman
(74) *Attorney, Agent, or Firm* — Bryan L. Loeffler, Esq.; Loeffler IP Group, P.A.

(57) ABSTRACT

A system for matching and compiling a water leak detection system having a plurality of components for a structure based on a plurality of variables or requirements depending on the type of structure and plumbing system contained therein.

13 Claims, 4 Drawing Sheets

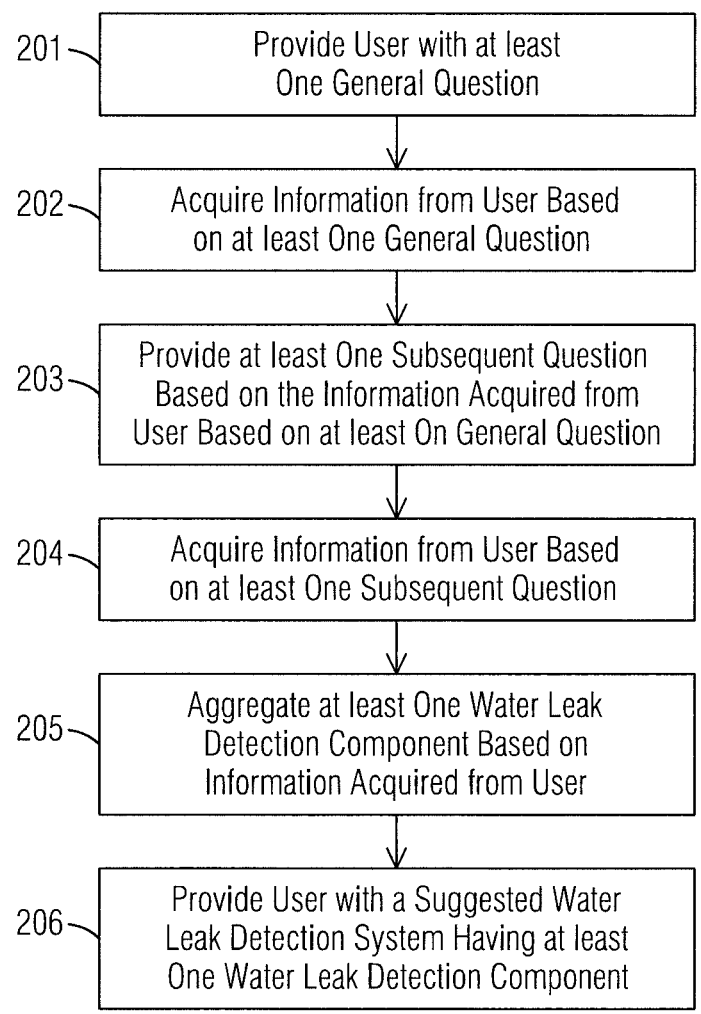

SYSTEM FOR MATCHING AND ASSEMBLING A WATER LEAK DETECTION SYSTEM

FIELD OF THE INVENTION

The present invention relates generally to the selection of water leak detection systems and components, and more particularly a system for matching and assembling a water leak detection system having a plurality of water leak detection components for a structure based on a plurality of variables relating to the structure.

BACKGROUND OF THE INVENTION

Water leak detection systems and related water leak detection components are designed to detect the presence of water from a leak within a structure and provide an alert in time to allow the prevention and/or minimize damage caused by the leak. Water leak detection systems may be used in single family dwellings, multi-family dwellings, commercial facilities and so forth. Given the wide variety of structures in which water leak detection systems may be installed and the specific requirements for each structure, it can be difficult to determine the correct system and components needed to meet the requirements for each structure.

Therefore, a need exists for a system for matching and compiling a water leak detection system having a plurality of components for a structure based on a plurality of variables or requirements depending on the type of structure and plumbing system contained therein.

SUMMARY OF THE INVENTION

The primary object of the present invention is to provide a system for matching and compiling a water leak detection system having a plurality of components for a structure based on a plurality of variables or requirements depending on the type of structure and plumbing system contained therein.

The present invention fulfills the above and other objects by providing a computer implemented system that enables a user to assemble a water leak detection system by selecting and matching water leak detection components to a home or structure by prompting the user to enter specific variables relating to a subject structure and to make appropriate selections of corresponding components based on those variables.

The system includes a central site connected for electronic communication through a networked communications system over the Internet. The central site includes at least one database containing product or component descriptions and specifications. The system of the present invention guides the user through the following steps: gathering information or variables relating to a subject structure, determining one or more required water leak detection component based on the variables relating to the subject structure, selecting one or more water leak detection components based on those determinations and compiling the selected water leak detection components into a water leak detection system, thereby creating a customized water leak detection system for the subject structure.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 2 is a flow chart showing the steps for progressing through a decision tree generated by the system of the present invention.

DESCRIPTION OF THE PREFERRED EMBODIMENTS

Figure 1:
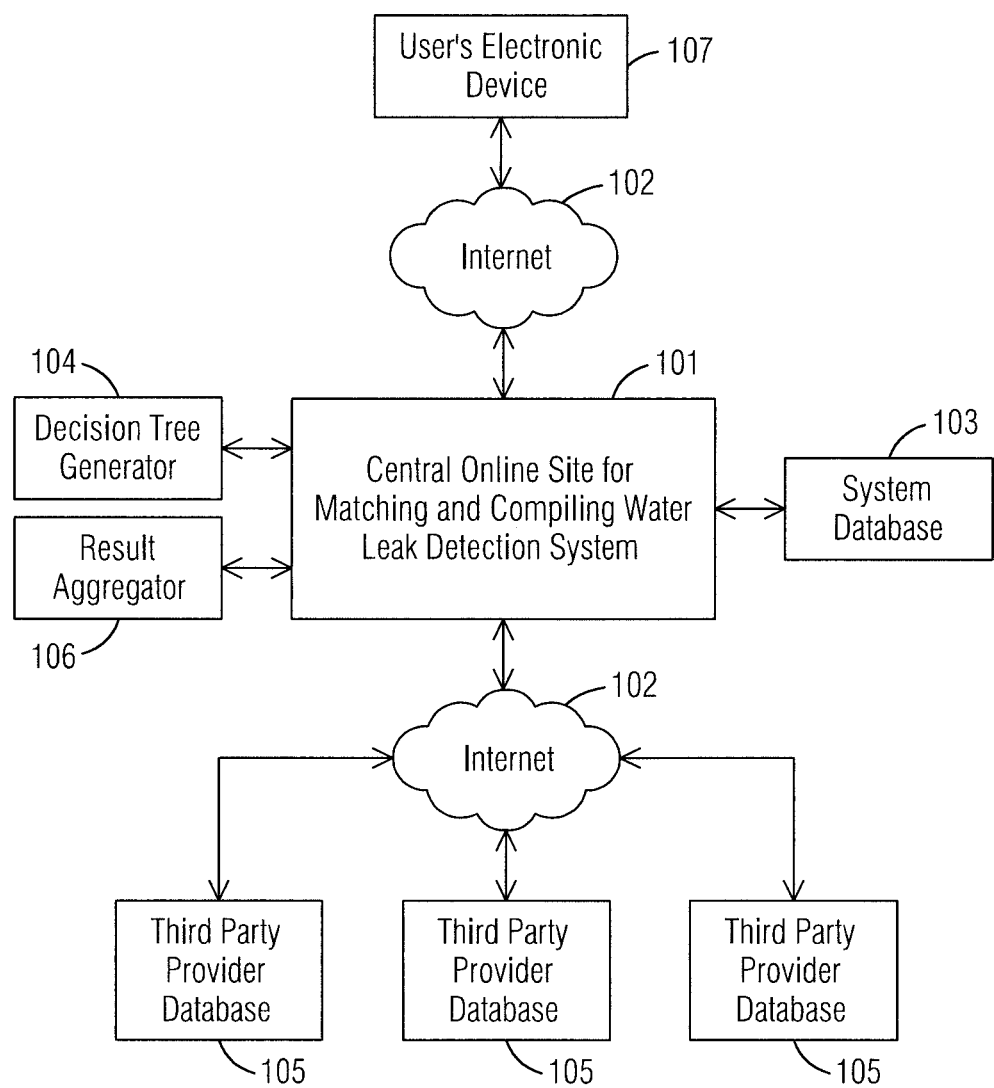
FIG. 1 is a block diagram of an environment configured for facilitating a system of the present invention.

With reference to FIG. 1, a block diagram of an environment configured for facilitating a system of the present invention is illustrated. The environment comprises a central online site 101 provided by a service provider and connected for electronic communication through a networked communications system over the Internet 102. The central online site 101 is accessible by a user via an electronic device 107 over the Internet. The central online site is connected to at least one system database 103 for storing information relating to the system of the present invention. The central online site 101 is connected to at least one decision tree generator 104, which provides sequential questions to a user based on information provided by the user through the central online site 101. One or more third party provider databases 105 are connected to the central online site 101 via the Internet. The central online site 101 may be connected to the third party provider's website and/or database in order to collect and aggregate information from the third party provider databases 105, such as available products from component suppliers, specifications from water leak detection component suppliers, available products from smart home component suppliers, communication protocols from smart home component suppliers, insurance rates from insurance companies and so forth. Third party databases 105 and service provider information stored within the at least one system database 103 is searched and aggregated via a result aggregator 106 so that relevant results based on information or variables provided by the user while progressing through questions produced by the decision tree generator 104 may be presented to the user as suggested components making up a water leak detection system and related data.

The system may also operate in an offline environment wherein the Users' electronic device 107 may access a graphical user interface equivalent to the central online site wherein the system is operated through a downloadable software and searchable information is stored locally on the electronic device 107.

Figure 3A:
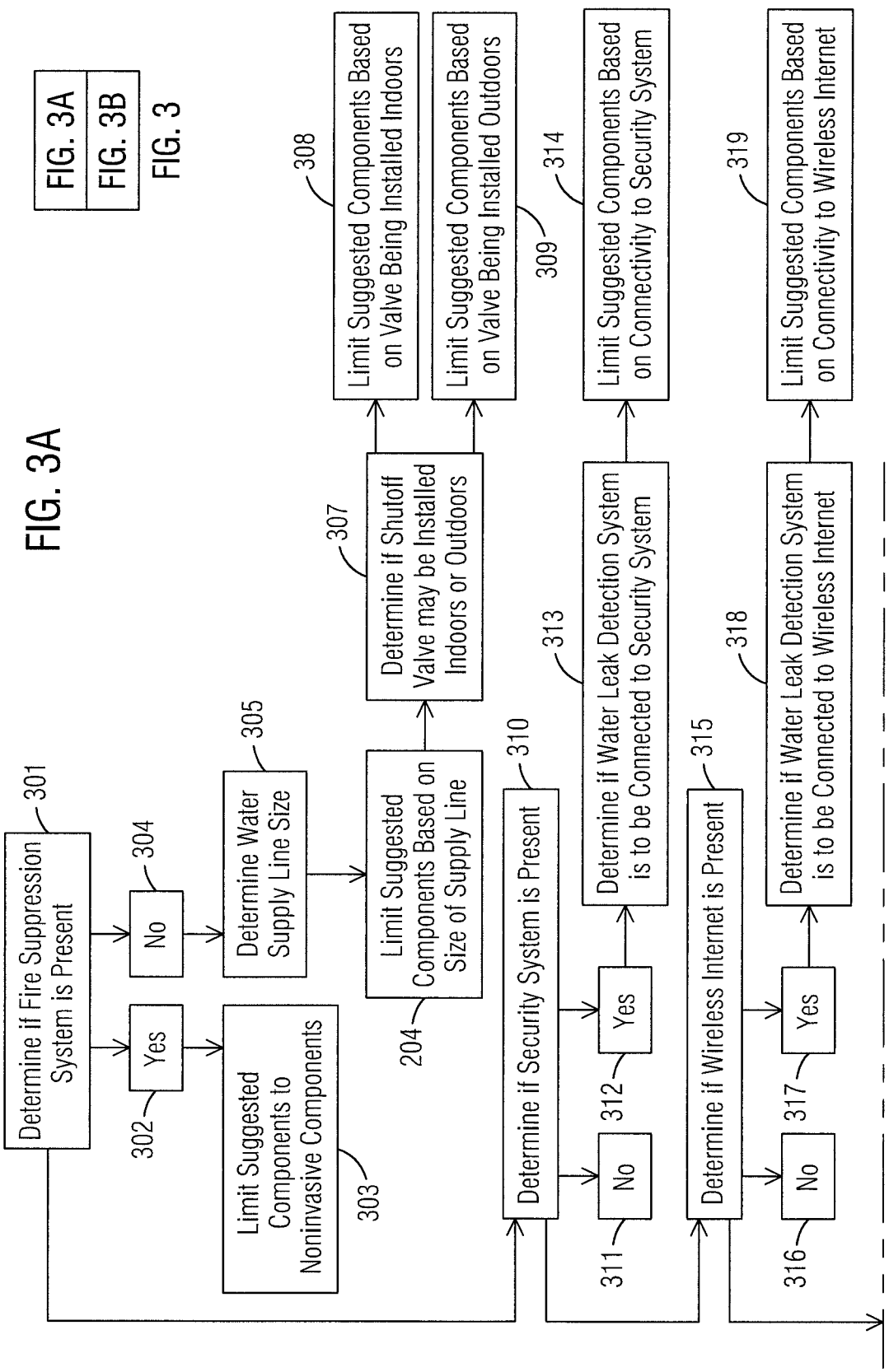
FIGS. 3a and 3b is a flow chart showing an exemplary decision tree used in system of the present invention.
Figure 3B:
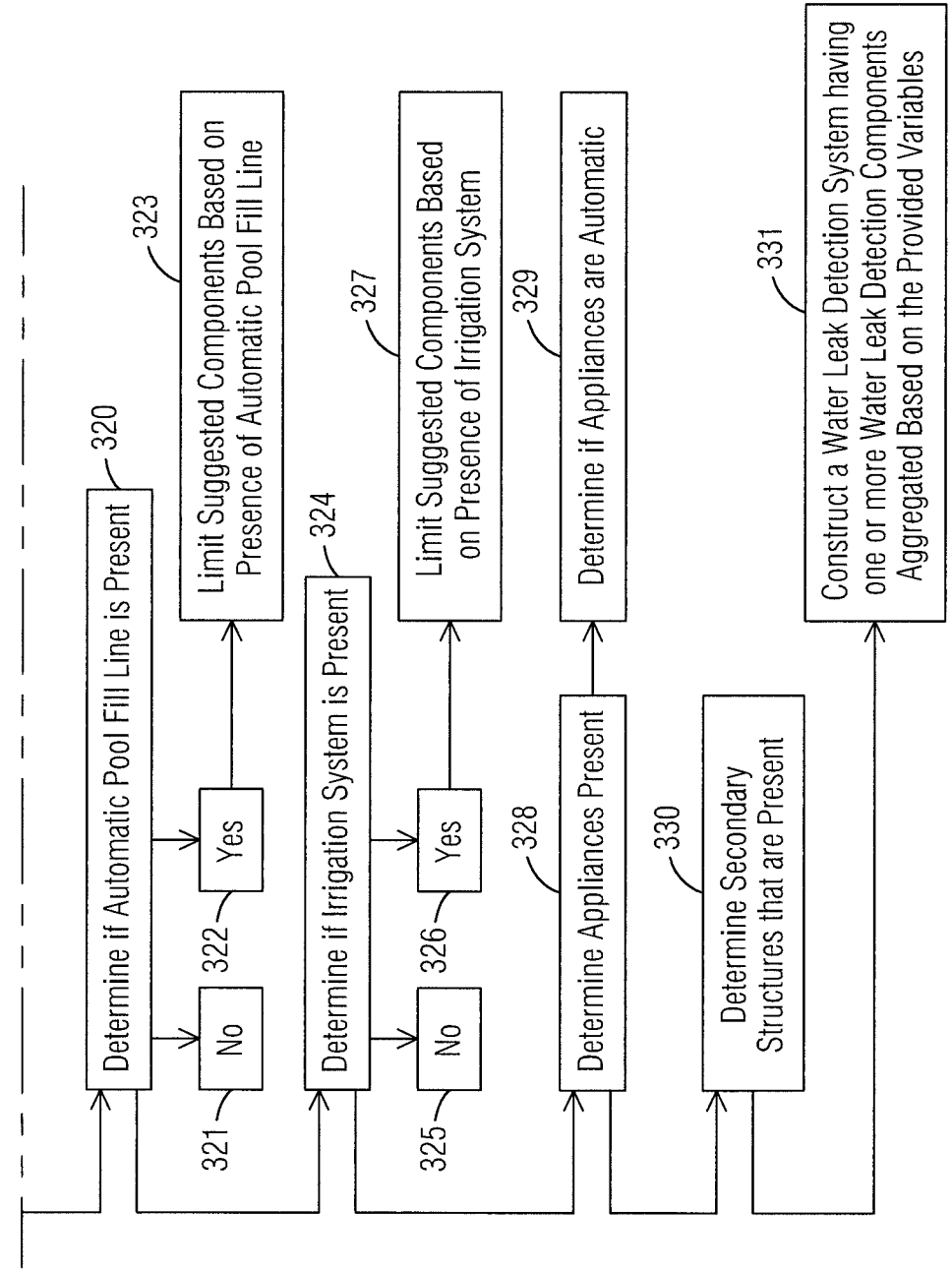

With reference to FIG. 2, a flow chart showing the steps for progressing through a decision tree generated by the system of the present invention is illustrated. First, a user is provided with at least one general question 201, as illustrated in FIGS. 3a and 3b, wherein the user is asked to provide at least one variable relating to a subject structure for which the user is assembling a water leak detection system. Then, the user provides information or at least one variable in response to the at least one general question 202. Next, the user is provided with at least one subsequent question based on the information or variable provided in response to the at least one general question 203. Then, the user provides information or at least one variable in response to the at least one subsequent question 204. Next, available components matching the information or variable provided by the user are searched and aggregated 205. Finally, the user is provided with a suggested water leak detection system having at least one water leak detection component 206. The user may also be provided with the option to purchase the at least one water leak detection component 206 and access to disclaimers, instructions and relevant accessories. The user may also track responses visibly so he or she can change the at least one water leak detection component 206 and/or a change to the at least one variable in response to the at least one general question 202. This allows the user to track how changes effect results provided by the system.

With reference to FIGS. 3a and 3b, a flow chart showing an exemplary decision tree used in the system of the present invention is illustrated. As illustrated in FIG. 2, the decision tree presents users with general questions that progress into more specific questions as information or variables regarding a subject structure are provided resulting in a suggested water leak detection system comprising at least one water leak detection component. For example, first a user is asked if the subject structure has a multipurpose fire suppression system 301. If the user answers yes 302, then any suggested water leak detection components are limited to non-invasive water leak detection components that do not attach to the plumbing system of the subject structure 303. If the answer is no 304, then suggested water leak detection components may be invasive or noninvasive and the user is asked to provide the size of a water supply line supplying water to the plumbing system of the subject structure 305. Then, any suggested water leak detection component shutoff valves are limited based on the size of the supply line 306. Then, the user is asked if the shutoff valve may be installed indoors or outdoors 307. If the shutoff valve may be installed indoors, then suggested water leak detection component shutoff valves may be limited to those that may be installed indoors 308. If the shutoff valve may be installed outdoors, then suggested water leak detection component shutoff valves may be limited to those that may be installed outdoors 309.

Next, the user is asked if a security system is present in the subject structure that the user wishes to integrate with 310. If the user answers NO 311, then the suggested water leak detection components may or may not be limited by the non-presence of the security system. If the user answers YES 312, then it is determined if the water leak detection system needs to be connected to the security system 313 and if so, then the suggested water leak detection components may be limited to those capable of being connected to the security system 314.

Then, the user is asked if wireless Internet is present in the subject structure 315. If the user answers NO 316, then the suggested water leak detection components may be limited by the non-presence of wireless Internet. If the user answers YES 317, then it is determined if the water leak detection system needs to be connected to the wireless Internet 318 and if so, then the suggested water leak detection components may be limited to those capable of being connected to the wireless Internet 319.

Next, the user is asked if an automatic pool fill line is present in the subject structure 320. If the user answers NO 321, then the suggested water leak detection components may or may not be limited by the non-presence of an automatic pool fill line. If the user answers YES 322, then the suggested water leak detection components may be limited to those capable of being connected to an automatic pool fill line 323 or work arounds with optional integratable accessories.

Then, the user is asked if an irrigation system is present in the subject structure 324. If the user answers NO 325, then the suggested water leak detection components may or may not be limited by the non-presence of an irrigation system. If the user answers YES 326, then the suggested water leak detection components may be limited to those capable of being connected to an irrigation system 327.

Next, an inventory of appliances present in the subject structure is provided by the user 328 and it is determined if any of those appliances have automatic features 329, such as icemakers and so forth.

Then, the user may provide information on any secondary structures that need to be protected by the water leak detection system 330.

Finally, the system takes the provided variable and information provided by the user and constructs a water leak detection system having one or more water leak detection components aggregated based on the provided variables 331.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A system for matching and compiling a water leak detection system having one or more water leak detection components for a subject structure based on a plurality of variables relating to the subject structure, said system comprising:

a central online site provided by a service provider and connected for electronic communication through a networked communications system over the Internet;

said central online site being accessible by a user via an electronic device over the Internet;

said central online site being connected to at least one system database for storing information;

said central online site being connected to at least one decision tree generator;

a plurality of third party provider databases connected to the central online site via the Internet wherein said third party provider databases store available products from said third party sellers; and a result aggregator for providing a plurality of available water leak detection components from said third party provider databases that in combination make up a water leak detection system for the subject structure.

2. The system of claim 1 wherein:

said plurality of suggested water leak detection components are provided based on at least one variable provided by the user while progressing through questions produced by the decision tree generator.

3. The system of claim 1 wherein:

said decision tree generator provides subsequent questions to a user based on variables provided by the user through the central online site.

4. The system of claim 1 wherein:

at least one third party provider database is a third party water leak detection component supplier.

5. The system of claim 1 wherein:
at least one third party provider database is a third party smart home component supplier.

6. The system of claim 1 wherein:
said decision tree generator provides at least one general question and a subsequent question based on a variable provides an answer to the at least one general question.

7. The system of claim 1 further comprising:
a graphical user interface equivalent to the central online site wherein the system is operated through a downloadable software and searchable information is stored locally on the electronic device.

8. A system for matching and compiling a water leak detection system having one or more water leak detection components for a subject structure based on a plurality of variables relating to the subject structure, said system comprising:
a central online site provided by a service provider and connected for electronic communication through a networked communications system over the Internet;
said central online site being accessible by a user via an electronic device over the Internet;
said central online site being connected to at least one system database for storing information;
said central online site being connected to at least one decision tree generator;
said decision tree generator provides subsequent questions to a user based on variables provided by the user through the central online site;
a plurality of third party provider databases connected to the central online site via the Internet wherein said third party provider databases store available products from said third party sellers; and
a result aggregator for providing a suggested plurality of water leak detection components making up a water leak detection system for the subject structure based on said variables provided by the user through the central online site in conjunction with available water leak detection components stored in said third party provider database.

9. The system of claim 8 wherein:
said plurality of suggested water leak detection components are provided based on at least one variable provided by the user while progressing through questions produced by the decision tree generator.

10. The system of claim 8 wherein:
at least one third party provider database is a third party water leak detection component supplier.

11. The system of claim 8 wherein:
at least one third party provider database is a third party smart home component supplier.

12. The system of claim 8 wherein:
said decision tree generator provides at least one general question and a subsequent question based on a variable provides an answer to the at least one general question.

13. The system of claim 8 further comprising:
a graphical user interface equivalent to the central online site wherein the system is operated through a downloadable software and searchable information is stored locally on the electronic device.

\* \* \* \* \*